(12) United States Patent
Wang et al.

(10) Patent No.: US 10,231,000 B2
(45) Date of Patent: Mar. 12, 2019

(54) ROUTING METHOD FOR COMBINED TELEVISION AND COMBINED TELEVISION

(71) Applicants: HISENSE ELECTRIC CO., LTD., Qingdao, Shandong (CN); HISENSE INTERNATIONAL CO., LTD., Qingdao, Shandong (CN); HISENSE USA CORPORATION, Suwanee, GA (US)

(72) Inventors: Jintong Wang, Shandong (CN); Quan Zhou, Shandong (CN); Sheng Zhong, Shandong (CN)

(73) Assignees: HISENSE ELECTRIC CO., LTD., Shandong (CN); HISENSE INTERNATIONAL CO., LTD., Shandong (CN); HISENSE USA CORPORATION, Suwanee, GA (US)

( * ) Notice: Subject to any disclaimer, the term of this patent is extended or adjusted under 35 U.S.C. 154(b) by 4 days.

(21) Appl. No.: 15/688,657

(22) Filed: Aug. 28, 2017

(65) Prior Publication Data

US 2017/0374393 A1    Dec. 28, 2017

Related U.S. Application Data

(63) Continuation of application No. PCT/CN2015/087826, filed on Aug. 21, 2015.

(30) Foreign Application Priority Data

Jul. 1, 2015    (CN) .......................... 2015 1 0377414

(51) Int. Cl.
*H04N 21/236*    (2011.01)
*H04N 21/64*    (2011.01)
*H04L 12/741*    (2013.01)

(52) U.S. Cl.
CPC ........... *H04N 21/236* (2013.01); *H04L 45/74* (2013.01); *H04N 21/64* (2013.01)

(58) Field of Classification Search
CPC ....... H04L 45/74; H04N 21/236; H04N 21/64
See application file for complete search history.

(56) References Cited

U.S. PATENT DOCUMENTS

2009/0296001 A1    12/2009    Chan
2013/0031591 A1    1/2013    Bai

FOREIGN PATENT DOCUMENTS

CN    200983627 Y    11/2007
CN    201374764    12/2009
(Continued)

OTHER PUBLICATIONS

International Search Report and Written Opinion dated Mar. 31, 2016, issued in International Application No. PCT/CN2015/087826 (w/partial English language translation).
(Continued)

*Primary Examiner* — Rong Le
(74) *Attorney, Agent, or Firm* — McDermott Will & Emery LLP

(57) ABSTRACT

A combined television includes a host and at least one smart module. The host is connected to an external network by a first physical network card, and is connected to the smart module by a second physical network card. A routing method includes: the host receives, via the second physical network card, a first data packet sent by a first intelligent module; parses the first data packet and obtains a source address and a destination address in the first data packet, the source address being an IP address of the first intelligent module; and when the destination address is an IP address of the external network, converts the first data packet into a second data packet, and sends the second data packet to the external network by the first physical network card, a source (Continued)

address in the second data packet being an IP address of the first physical network card.

12 Claims, 5 Drawing Sheets

(56) References Cited

FOREIGN PATENT DOCUMENTS

| | | |
|---|---|---|
| CN | 201690538 | 12/2010 |
| CN | 102322263 | 1/2012 |
| CN | 102833605 A | 12/2012 |
| CN | 102905177 A | 1/2013 |
| CN | 203590374 U | 5/2014 |
| CN | 204090050 U | 1/2015 |

OTHER PUBLICATIONS

Office Action issued in Chinese Application No. 201510377414.0 dated Aug. 28, 2018 (with English translation).

US 10,231,000 B2

ROUTING METHOD FOR COMBINED TELEVISION AND COMBINED TELEVISION

CROSS-REFERENCE TO RELATED APPLICATIONS

This application is a Bypass Continuation Application of PCT/CN2015/087826 filed on Aug. 21, 2015, which claims priority to Chinese Patent Application No. 201510377414,0, filed with the Chinese Patent Office on Jul. 1, 2015, and entitled "ROUTING METHOD FOR COMBINED TELEVISION AND COMBINED TELEVISION", the entirety of which is incorporated hereby by reference.

TECHNICAL FIELD

The present application relates to televisions, and particularly to a combined television and a routing method thereof.

BACKGROUND

In recent years, with the arrival of digital home, various digital home appliances used in people's family life communicate with each other via home network, so that information sharing and device control can be implemented on a home network platform. Television is an important digital home appliance in family life. Digitization and intellectualization requirements for the television are higher and higher. In the current field of digital television, there are different kinds of external digital devices which could be applied to the television, such as a high definition network set-top box, a smart TV box, a TV card and so on. It is a popular to connect these external digital devices to the digital television by a routing device, in which case a combined television is presented by researchers.

SUMMARY

In a first aspect, a routing method for a combined television is provided. The combined television includes a host and at least one intelligent module. The host includes a first physical network card and at least one second physical network card. The host is connected to an external network via the first physical network card, and to the at least one intelligent module via the at least one second physical network card. The method includes:

receiving, by the host, a first data packet sent by a first intelligent module of the at least one intelligent module via the second physical network card;

parsing the first data packet to obtain a source address and a destination address from the first data packet, wherein the source address is an IP address of the first intelligent module;

converting the first data packet into a second data packet in response to the determination that the destination address is an IP address of the external network, wherein the source address in the second data packet is an IP address of the first physical network card and the destination address is the IP address of the external network; and sending the second data packet to the external network via the first physical network card.

In a second aspect, a routing method for a combined television is provided. The combined television includes a host and at least one intelligent module. The host is connected to an external network device via a first physical network card, and to the at least one intelligent module via at least one second physical network card. The method includes:

receiving, by the host, a first data packet via the first physical network card;

parsing the first data packet to obtain a source address and a destination address from the first data packet, wherein the source address is an IP address of the external network; and the destination address is an IP address of a target intelligent module;

obtaining an IP address of the second physical network card according to the IP address of the target intelligent module;

converting the first data packet into a second data packet, wherein a source address of the second data packet is an IP address of the second physical network card, and a destination address of the second data packet is the IP address of the target intelligent module; and sending the second data packet to the target intelligent module via the second physical network card.

In a third aspect, a combined television is provided. The combined television includes a host and at least one intelligent module. The host includes a first physical network card and at least one second physical network card. The host is connected to an external network via the first physical network card, and to the at least one intelligent module via the at least one second physical network card. The host further includes a memory for storing instructions and at least one processor, wherein the at least one processor is configured to execute the instructions to:

receive a first data packet sent by a first intelligent module of the at least one intelligent module via the second physical network card;

parse the first data packet to obtain a source address and a destination address from the first data packet, wherein the source address is an IP address of the first intelligent module;

convert the first data packet into a second data packet in response to the determination that the destination address is an IP address of the external network, wherein a source address in the second data packet is an IP address of the first physical network card, and a destination address is the IP address of the external network; and send the second data packet to the external network via the first physical network card.

In a fourth aspect, a combined television is provided. The combined television includes a host and at least one intelligent module. The host is connected to an external network device via a first physical network card, and to the at least one intelligent module via at least one second physical network card. The host further includes a memory for storing instructions and at least one processor, wherein the at least one processor is configured to execute the instructions to:

receive a first data packet via the first physical network card;

parse the first data packet to obtain a source address and a destination address from the first data packet, wherein the source address is an IP address of the external network, and the destination address is an IP address of a target intelligent module;

obtain an IP address of the second physical network card according to the IP address of the target intelligent module;

convert the first data packet into a second data packet, wherein a source address of the second data packet is an IP address of the second physical network card, and a destination address of the second data packet is the IP address of the target intelligent module; and send the second data packet to the target intelligent module via the second physical network card.

BRIEF DESCRIPTION OF THE DRAWINGS

To describe the technical solutions in embodiments of the present application or in the prior art more clearly, the accompanying drawings to be used in the description of the embodiments or the prior art will be briefly described below. Apparently, the accompanying drawings to be described below are merely some of the embodiments of the present application, and a person of ordinary skill in the art can obtain other drawings according to these drawings without paying any creative effort.

DETAILED DESCRIPTION

The technical solutions in the embodiments of the present application will be clearly and completely described hereinafter with reference to the accompanying drawings in the embodiments of the present application. Obviously, the described embodiments are merely a part, but not all of the embodiments of the present application. All other embodiments obtained based on the embodiments of the present application by a person of ordinary skill in the art without paying any creative effort shall fall into the protection scope of the present invention.

Figure 1:
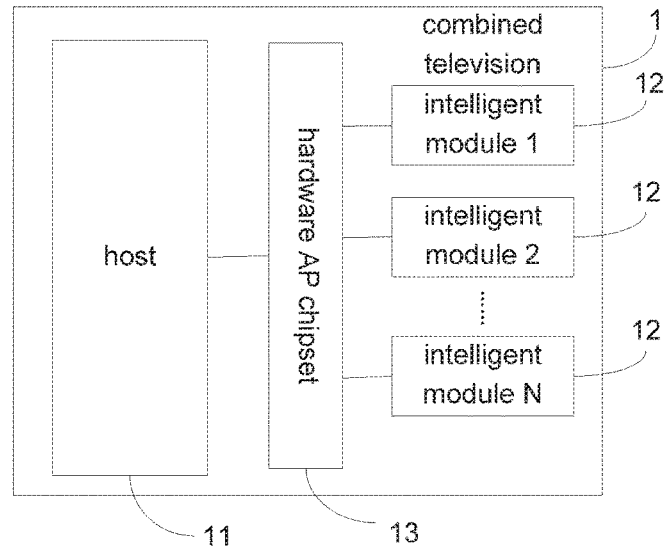
FIG. 1 is a schematic structural diagram of a typical combined television according to an embodiment of the present application.

An typical architecture of the combined television is shown in FIG. 1. The combined television 1 includes a digital television host 11, at least one intelligent module 12 (intelligent module 1, intelligent module 2, intelligent module N, as shown in FIG. 1), and a hardware wireless access point (AP) chipset 13. The foregoing intelligent modules are external digital devices (these external digital devices are directly installed inside the combined television instead of connected to the television as set-top boxes). The hardware AP chipset in the combined television serves as an interior router of the combined television, and is mainly responsible for allocating IP, switching data and forwarding data, etc., for the host and each intelligent module. The hardware AP chipset accesses to the internet directly and provides uniform internet access connections for the combined television. In addition, the hardware AP chipset can also provide wireless fidelity (Wi-Fi) hotspot function for devices outside the television.

However, the cost of the hardware AP chipset in the combined television is too high, which increases the cost of the whole combined television greatly. In addition, the hardware AP chipset has an individual operating system, which results in too long startup time and high power consumption.

Figure 2:
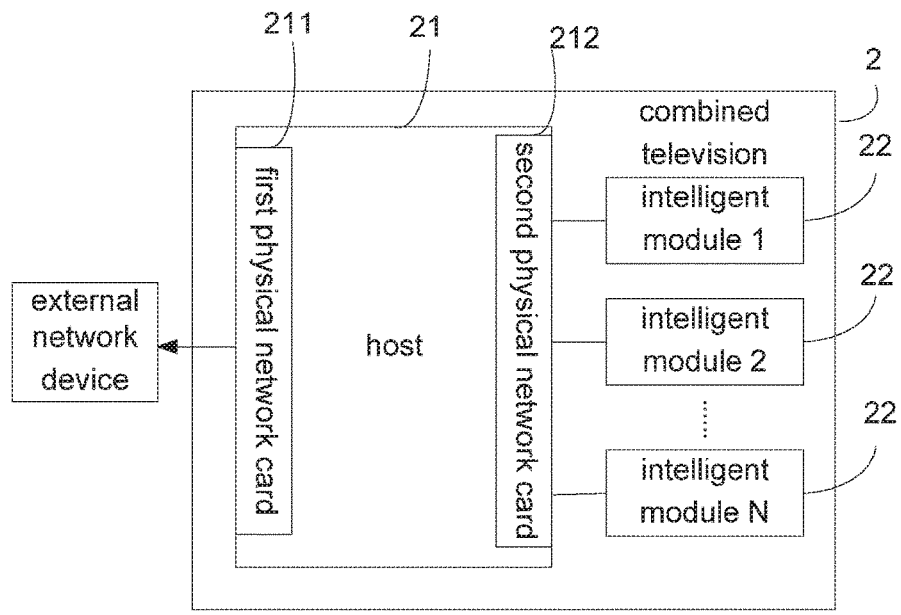
FIG. 2 is a schematic structural diagram of a combined television according to an embodiment of the present application.

FIG. 2 shows architecture of a combined television according to an embodiment of the present application. The combined television 2 includes a host 21 and at least one intelligent module 22 (intelligent module 1, intelligent module 2, . . . , intelligent module N, as shown in FIG. 2). The host 21 includes a first physical network card 211 and at least one second physical network card 212. The host 21 is connected to an external network via the first physical network card 211, and to the at least one intelligent module 22 via the at least one second physical network card 212. The intelligent module 22 in the combined television 2 may be considered as an external digital device applied to a television, such as, network set-top box, TV card, smart TV box and other digital devices which can access to the internet. Instead of as a set-top box, such external digital device is directly installed inside the combined television as a module of the combined television. It should be noted that the first physical network card 211 and the second physical network card 212 have exactly the same specific hardware composition, and are merely connected to different objects.

Figure 3:
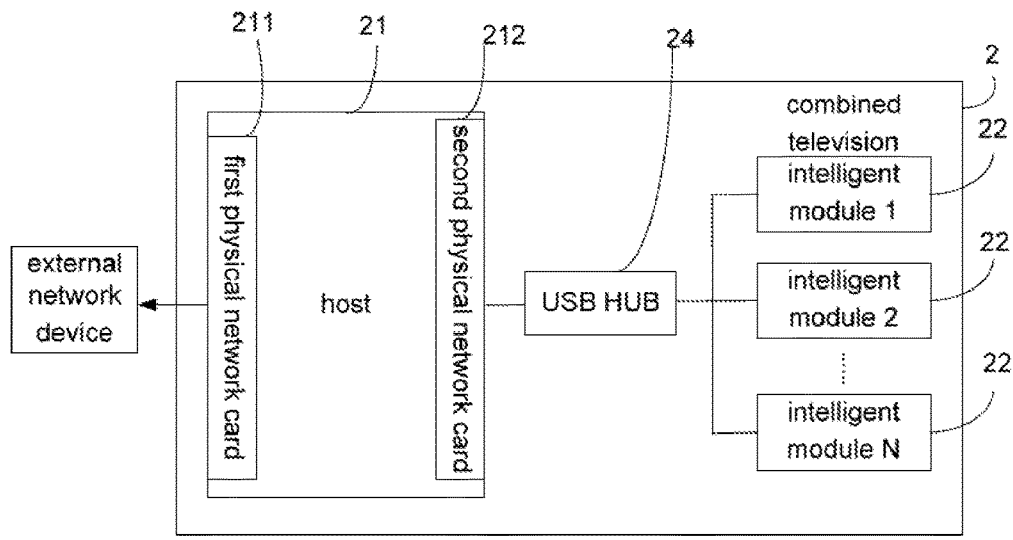
FIG. 3 is a schematic structural diagram of another combined television according to an embodiment of the present application.
Figure 4:
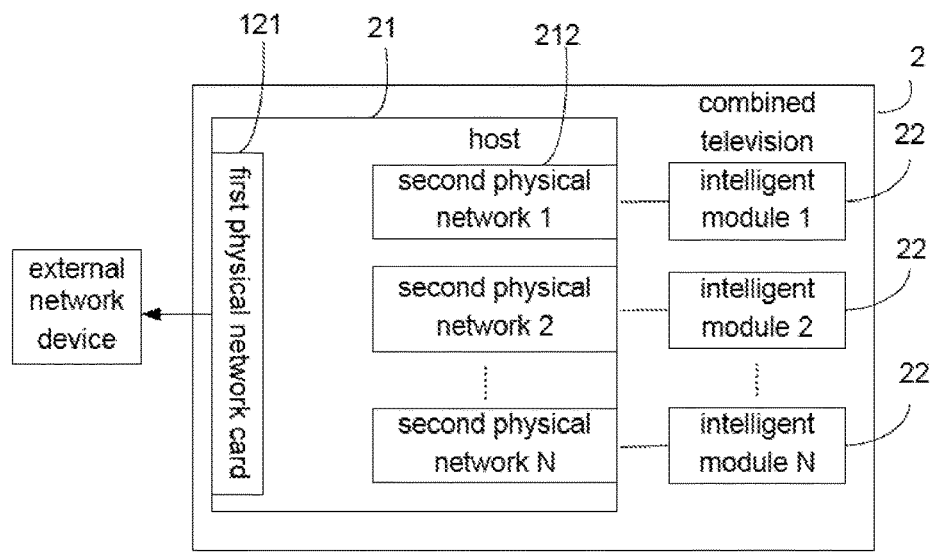
FIG. 4 is a schematic structural diagram of yet another combined television according to an embodiment of the present application.

In addition, as shown in FIG. 3, a combined television in an embodiment further includes an Ethernet HUB (hub) 24 if the number of the intelligent modules 22 in the embodiment is greater than the number of the second physical network cards 212, as a physical network card can be connected to only one intelligent module 22 in general. The host 21 is connected to the Ethernet HUB 24 via the second physical network card 212, so that the second physical network card 212 may be connected to a plurality of intelligent modules 22 via the HUB 24. The Ethernet HUB 24 includes at least one Ethernet port, and each Ethernet port is connected to one intelligent module 22. It should be noted that FIG. 3 is just an illustration. In a combined television, the host 21 may include a plurality of second physical network cards 212, and each second physical network card 212 may be connected to one intelligent module 22 directly, or to a plurality of intelligent modules 22 via the Ethernet HUB 24, If the number of the second physical network cards 212 in an embodiment is greater than or equal to the number of the intelligent modules 22, as shown in FIG. 4, each intelligent module 22 of the combined television is connected to an individual second physical network card 212.

Figure 5:
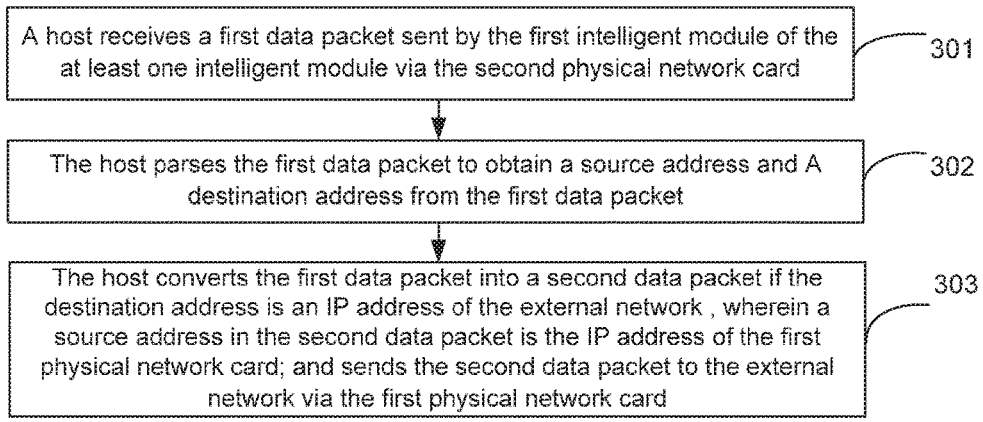
FIG. 5 is a schematic flowchart of a routing method for combined television according to an embodiment of the present application.

Based on the combined televisions corresponding to FIGS. 1, 2, 3 and 4, a routing method is provided in an embodiment of the present application. As shown in FIG. 5, the method specifically includes the following steps.

301. A host receives a first data packet sent by the first intelligent module of at least one intelligent module via the second physical network card.

302. The host parses the first data packet to obtain a source address and a destination address from the first data packet, As an example, the first data packet includes a source address and a destination address. The source address of the first data packet is an IP address of a first intelligent module, and the destination address is an IP address of an external network. In addition, the first data packet further includes a MAC address of the first intelligent module. If the destination address in the first data packet is the IP address of the external network, it means the first intelligent module is to access the external network. If the destination address in the first data packet is an IP address of a second intelligent module (other intelligent module than the first intelligent module), it means that the first intelligent module is to access the second intelligent module to share data of the second intelligent module.

303. The host converts the first data packet into a second data packet if the destination address is the IP address of the external network, wherein a source address in the second data packet is the IP address of the first physical network card; and sends the second data packet to the external network via the first physical network card.

If in step 301 the destination address of the first data packet received by the host is an IP address of the second intelligent module, the method further includes the following step after step 302:

304. The host converts the first data packet into a third data packet if the destination address is the IP address of the second intelligent module, wherein the source address in the third data packet is the IP address of the second physical network card and the destination address is the IP address of the second intelligent module; and sends the third data packet to the second intelligent module via the second physical network card.

As an example, the architecture of the combined television in the embodiment is shown in FIGS. 2, 3 and 4, the combined television includes more than one second physical network cards, and each second physical network card is connected to at least one intelligent module. At this situation, step 301 may include:

301a. A host receives a first data packet sent by a first intelligent module via a second physical network card connected to the first intelligent module.

Based on step 301a, step 304 may include the following step: 304a. The host converts the first data packet into a third data packet if the destination address is an IP address of a second intelligent module, wherein the source address in the third data packet is an IP address of a second physical network card connected to the second intelligent module and the destination address is the IP address of the second intelligent module; and sends the third data packet to the second intelligent module via the second physical network card connected to the second intelligent module.

It should be noted that the IP addresses of the intelligent module, the second physical network card and the first physical network card in the combined television belong to a same network segment.

In the routing method for combined television provided in the embodiment of the present application, a first physical network card and at least one second physical network card are added to the host of the combined television, so that the host can be connected to an external network via the first physical network card and to the intelligent modules via the at least one second physical network cards. In this way, when the host receives a first data packet sent by a first intelligent module via the second physical network card, a source address and a destination address are obtained from the first data packet by parsing the first data packet; wherein the source address is the IP address of the first intelligent module. In turn, if the destination address is an IP address of an external network, the first data packet is converted into a second data packet; wherein the source address in the second data packet is the IP address of the first physical network card. Then the second data packet is sent to the external network via the first physical network card. In this way, a requirement of sharing network among the intelligent modules in the combined television is met and a routing function is implemented in the combined television without a hardware AP chipset, thereby reducing the hardware cost of the combined television.

Figure 6:
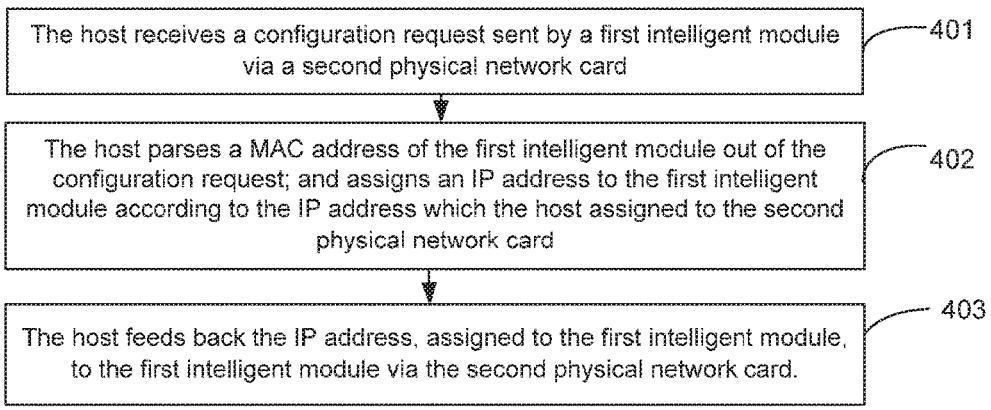
FIG. 6 is a schematic flowchart of another routing method for combined television according to an embodiment of the present application.

A routing method is provided by another embodiment of the present application, and this embodiment is focused on a process in which the host assigns IP addresses to intelligent modules in a combined television. As shown in FIG. 6, the method may include the following steps:

401. The host receives a configuration request sent by a first intelligent module via a second physical network card.

Wherein, the foregoing configuration request is used for enabling the host to assign a corresponding IP address to a first intelligent module.

402. The host parses a MAC address of the first intelligent module out of the configuration request, and assigns an IP address to the first intelligent module according to the IP address which the host assigned to the second physical network card.

403. The host returns the IP address, assigned to the first intelligent module, to the first intelligent module via the second physical network card.

In this embodiment, after assigning an IP address to each intelligent module, the host stores the IP address and the MAC address corresponding to each intelligent module for future use and for distinguishing different intelligent modules, in which there is a one-to-one correspondence between the IP address and the MAC address.

As an example, with reference to the architecture of the combined television shown in FIG. 4, each intelligent module in the combined television in an embodiment independently occupies one second physical network card. In the case of the host in the combined television originally includes only one network card (the first physical network card in FIG. 4), a plurality of second physical network cards may be added into the host. The second physical network cards are, for example, network cards No. 1, 2 and 3 each corresponding to one intelligent module, and then the host includes four network cards in total. It is assumed that there are three intelligent modules inside the combined television, and intelligent modules 1, 2 and 3 are respectively connected to network cards No. 1, 2 and 3 of the host. A network card No. 0 is connected to the external internet. After this network structure is constructed, internet access capability of the network card No. 0 is shared with the network cards No. 1, 2 and 3 in the host, that is, the network cards No. 1, 2 and 3 are assigned IP addresses in a same network segment with the IP address of the network card No. 0. Then, the host assigns corresponding IP addresses respectively to intelligent modules 1, 2, 3 based on corresponding IP addresses of the network cards No. 1, 2 and 3, so that intelligent modules 1, 2, 3 may acquire Internet access capability through network card No. 0. In addition, as the IP addresses of the intelligent modules 1, 2, 3 are assigned by the host, intelligent modules 1, 2, 3 are to be in the same network segment with the host, so that the intelligent modules 1, 2, 3 have the capability of interconnecting with the host.

In the routing method for the combined television provided in the embodiment of the present application, a first physical network card and at least one second physical network card are added to the host of the combined television, so that the host can be connected to an external network via the first physical network card and to the intelligent modules via the at least one second physical network card. When an intelligent module in the combined television needs to access to the network, the host receives a configuration request sent by the intelligent module via the second physical network card, parses a MAC address of the intelligent module out of the configuration request, and assigns an IP address to the intelligent module according to the IP address of the second physical network card assigned by the host. Lastly, the host returns the IP address, assigned to the intelligent module, to the intelligent module via the second physical network card according to the MAC address of the intelligent module. In this way, as the IP addresses of the intelligent modules and the second physical network card are both assigned by the host, the intelligent modules and the second physical network card in the combined television belong to a same network segment. Therefore, the intelligent modules in the combined television may have capability of interconnecting with the host, and thus the routing function may be implemented in the combined television without a hardware AP chipset, thereby reducing the hardware cost of the combined television.

Figure 7:
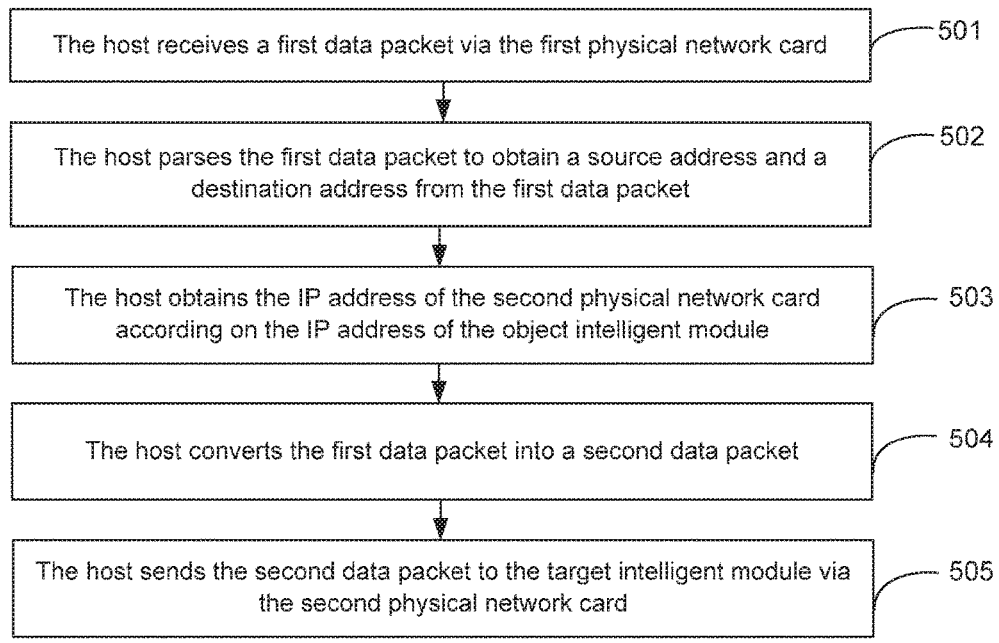
FIG. 7 is a schematic flowchart of yet another routing method for combined television according to an embodiment of the present application.

Based on the combined televisions corresponding to FIGS. 1, 2, 3 and 4, a routing method for the combined television is provided in an embodiment of the present application. This embodiment is focused on a process in which an external network returns data to an intelligent module in the combined television when the intelligent module requests data from the external network. As shown in FIG. 7, the method may include the following steps:

501. The host receives a first data packet via a first physical network card.

502. The host parses the first data packet to obtain a source address and a destination address from the first data packet.

Wherein, the foregoing source address of the first data packet is an IP address of the external network, and the destination address of the first data packet is an IP address of a target intelligent module.

503. The host obtains an IP address of a corresponding second physical network card according to the IP address of the target intelligent module.

Specifically, step 503 may include the following step: the host retrieves the IP address of the second physical network card corresponding to the IP address of the target intelligent module from an information mapping table, wherein the information mapping table is used for storing history of data packet received/sent by the host via the second physical network card, and the history includes corresponding relationship between the destination address and the source address of data packet received/sent via the second physical network card.

504. The host converts the first data packet into a second data packet.

Wherein, a source address of the foregoing second data packet is the IP address of the second physical network card, and a destination address of the second data packet is the IP address of the target intelligent module.

505. The host sends the second data packet to the target intelligent module via the second physical network card.

In the routing method for the combined television provided in the embodiment of the present application, a first physical network card and at least one second physical network card are added to the host of the combined television, and then the host can be connected to an external network via the first physical network card and to the intelligent modules via the at least one second physical network card. In this way, when the host receives a first data packet sent by the external network via the first physical network card, a source address and a destination address can be obtained from the first data packet by parsing the first data packet. Wherein, the source address of the first data packet is an IP address of the external network and the destination address is an IP address of a target intelligent module. Then the host obtains an IP address of the second physical network card according to the IP address of the target intelligent module, and converts the first data packet into a second data packet. The source address of the second data packet is the IP address of the second physical network card and the destination address is the IP address of the target intelligent module. Lastly, the second data packet is sent to the target intelligent module via the second physical network card. In this way, a routing function is implemented in the combined television without a hardware AP chipset. Therefore, the external network may directly access to the intelligent module in the combined television, and the hardware cost of the combined television is reduced.

Figure 8:
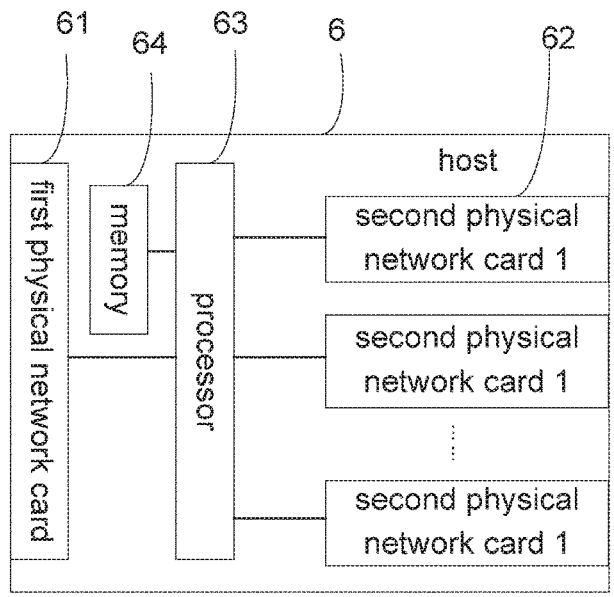
FIG. 8 is a schematic structural diagram of a host of a combined television according to an embodiment of the present application.

A combined television is provided in an embodiment of the present application. As shown in FIGS. 1, 2, 3 and 4, the combined television includes a host and at least one intelligent module. As shown in FIG. 8, the host 6 includes a first physical network card 61 and one or more second physical network cards 62. The host 6 is connected to an external network via the first physical network card 61. The host 6 is connected to at least one intelligent module via the second physical network card(s) 62. The host 6 further includes a memory 64 for storing instructions and at least one processor 63, wherein:

The at least one processor 63 is configured to execute the instructions to: receive a first data packet sent by a first intelligent module of the at least one intelligent module via the second physical network card 62; parse the first data packet to obtain a source address and a destination address from the first data packet, wherein the source address is an IP address of the first intelligent module; convert the first data packet into a second data packet if the destination address is an IP address of the external network, wherein the source address in the second data packet is the IP address of the first physical network card and the destination address is the IP address of the external network; and send the second data packet to the external network via the first physical network card 61.

Optionally, the at least one processor 63 is further configured to execute the instructions to: convert the first data packet into a third data packet if the destination address is an IP address of a second intelligent module of the at least one intelligent module, wherein a source address in the third data packet is an IP address of the second physical network card and an destination address in the third data packet is an IP address of the second intelligent module; and send the third data packet to the second intelligent module via the second physical network card.

Optionally, the at least one processor 63 is further configured to execute the instructions to receive a configuration request sent by the first intelligent module via the second physical network card 62; parse a MAC address of the first intelligent module from the configuration request; assign an IP address to the first intelligent module based on the IP address assigned to the second physical network card 62 by the host; and return the IP address, assigned to the first intelligent module, to the first intelligent module via the second physical network card 62.

Optionally, if the combined television includes more than one second physical network cards 62, each second physical network card 62 is connected to at least one intelligent module.

The at least one processor 63 is further configured to execute the instructions to receive the first data packet sent by the first intelligent module via the second physical network card 62 connected to the first intelligent module.

The at least one processor 63 is configured to execute the instructions to converts the first data packet into a third data packet in response to the determination that the destination address is the IP address of a second intelligent module, and sends the third data packet to the second intelligent module via the second physical network card 62, wherein the source address in the third data packet is the IP address of the second physical network card 62. Specifically, the at least one processor 63 is configured to execute the instructions to: convert the first data packet into a third data packet in response to the determination that the destination address is the IP address of a second intelligent module, wherein the source address in the third data packet is the IP address of the second physical network card 62 connected to the second intelligent module; and send the third data packet to the second intelligent module via the second physical network card 62 connected to the second intelligent module.

In the combined television provided in the embodiment of the present application, a first physical network card and at least one second physical network card are added to the host of the combined television, so that the host can be connected to an external network via the first physical network card and to the intelligent modules via the at least one second physical network card. In this way, when the host receives a first data packet sent by a first intelligent module via the second physical network card, a source address and a destination address are obtained from the first data packet by parsing the first data packet; wherein the source address is an IP address of the first intelligent module. Then the first data packet is converted into a second data packet in response to the determination that the destination address is an IP address of the external network; wherein the source address in the second data packet is the IP address of the first physical network card. The second data packet is sent to the external network via the first physical network card. In this way, requirement of sharing the network among the intelligent modules in the combined television is met while a routing function is implemented in the combined television without a hardware AP chipset, thereby reducing the hardware cost of the combined television.

Figure 9:
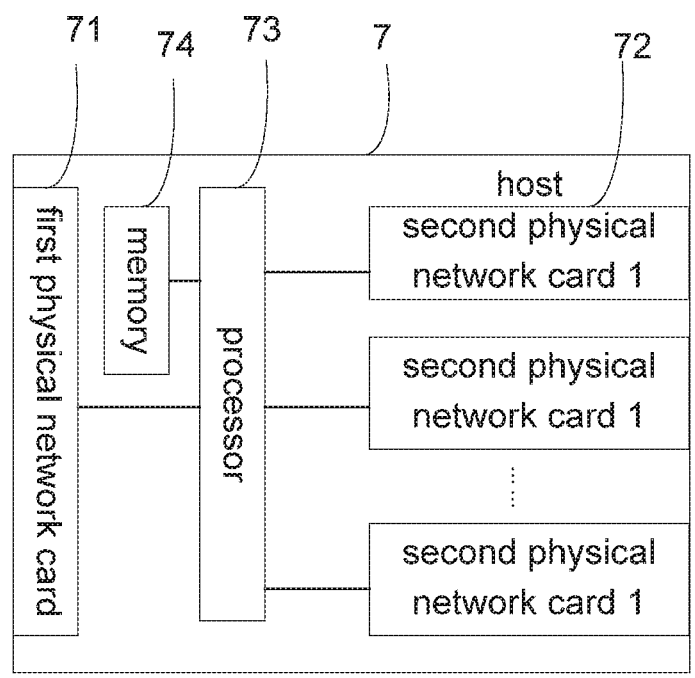
FIG. 9 is a schematic structural diagram of a host of another combined television according to an embodiment of the present application.

A combined television is provided in an embodiment of the present application. As shown in FIGS. 1, 2, 3 and 4, the combined television includes a host and at least one intelligent module, As shown in FIG. 9, the host 7 includes a first physical network card 71 and a second physical network card 72. The host 7 is connected to an external network via the first physical network card 71. The host 7 is connected to the at least one intelligent module via the second physical network card 72. The host 7 further includes a memory 74 for storing instructions and at least one processor 73, wherein:

The at least one processor 73 is configured to execute the instructions to: receive a first data packet via the first physical network card 71; parse the first data packet to obtain a source address and a destination address from the first data packet, wherein the source address is an IP address of the external network, and the destination address is an IP address of an target intelligent module; obtain an IP address of the corresponding second physical network card 72 according to the IP address of the target intelligent module; convert the first data packet into a second data packet, wherein the source address of the second data packet is the IP address of the second physical network card 72, and the destination address of the second data packet is the IP address of the target intelligent module; and send the second data packet to the target intelligent module via the second physical network card 72.

Optionally, the at least one processor 73 is further configured to execute the instructions to retrieve the IP address of the second physical network card 72 corresponding to the IP address of the target intelligent module from an information mapping table. The information mapping table is used for storing history of data packet received/sent by the host via the second physical network card 72. The history includes corresponding relationship between the destination address and the source address of data packet received/sent via the second physical network card 72.

In the combined television provided in the embodiment of the present application, a first physical network card and at least one second physical network card are added to the host of the combined television, and then the host can be connected to an external network via the first physical network card and to the intelligent modules via the at least one second physical network card. In this way, when the host receives a first data packet sent by the external network via the first physical network card, a source address and a destination address can be obtained from the first data packet by parsing the first data packet. The source address of the first data packet is an IP address of the external network and the destination address is an IP address of a target intelligent module. Then the host obtains an IP address of the corresponding second physical network card according to the IP address of the target intelligent module, and converts the first data packet into a second data packet. The source address of the second data packet is the IP address of the second physical network card and the destination address is the IP address of the target intelligent module. Lastly, the second data packet is sent to the target intelligent module via the second physical network card. In this way, a routing function is implemented in the combined television without a hardware AP chipset. Therefore, the external network may directly access to the intelligent module in the combined television, and the hardware cost of the combined television is reduced.

Those skilled in the art to which the present invention pertains may clearly understand that only examples of partition of the forgoing functional modules are given for convenience and simplicity of description. In practical use, the foregoing functions may be implemented by different functional modules as required. That is, the internal structure of the device is divided into different functional modules to implement all or a part of the functions described above. Corresponding processes in the foregoing method embodiments may be referred to for specific working processes of the system, the devices and the units described above, which will not be repeated redundantly herein.

In several embodiments provided in the present application, it should be understood that, the disclosed devices and methods may be implemented in other manners. For example, the device embodiments described above are merely exemplary, e.g., partition of the modules or units is only a logic functionality partition, and other partitioning manner may be used in a practical implementation. For example, a plurality of units or components may be combined or integrated into another system, or some features may be omitted or not implemented. From another point of view, the displayed or discussed mutual coupling or direct coupling or communication connection may be indirect coupling or communication connection of devices or units through some interfaces.

In addition, the functional units in the embodiments of the present application may be integrated in a processing unit, or the units separately exist physically, or two or more units are integrated in one unit. The foregoing integrated units may be implemented in the form of hardware, or implemented in the form of a software functional unit.

As mentioned above, the foregoing embodiments are for illustrating the technical solutions of the present application only, and are not intended to limit thereto. Although the present application is described in detail with reference to the above embodiments, a person of ordinary skill in the art should understand that modifications to the solutions recited in above embodiments or replacements to part of technical features therein are possible. Such modifications or replacements will not make the nature of corresponding solutions depart from the spirit and scopes of the solutions of the embodiments of the present application.

What is claimed is:

1. A routing method for a combined television comprising a host and at least one intelligent module, wherein said host comprises a first physical network card and at least one second physical network card, said host is connected to an external network via said first physical network card, and said host is connected to said at least one intelligent module via said at least one second physical network card, said method comprising:
   receiving, by said host, a first data packet sent by a first intelligent module of said at least one intelligent module via said second physical network card;
   parsing said first data packet to obtain a source address and a destination address from said first data packet, wherein said source address is an IP address of said first intelligent module;
   converting said first data packet into a second data packet in response to the determination that said destination address is an IP address of the external network, wherein the source address in said second data packet is an IP address of the first physical network card and said destination address is the IP address of the external network; and sending said second data packet to the external network via said first physical network card.

2. The method according to claim 1, wherein after parsing said first data packet to obtain the source address and the destination address from said first data packet, said method further comprises:
   converting said first data packet into a third data packet in response to the determination that said destination address is an IP address of a second intelligent module of said at least one intelligent module, wherein a source address of said third data packet is an IP address of the second physical network card and said destination address is an IP address of said second intelligent module; and sending said third data packet to the second intelligent module via said second physical network.

3. The method according to claim 2, wherein said combined television comprises more than one second physical network card, each second physical network card is at least connected to one intelligent module;
   receiving, by said host, a first data packet sent by a first intelligent module via said second physical network card, specifically comprises: receiving, by said host, the first data packet sent by said first intelligent module via the second physical network card connected to the first intelligent module; and
   converting said first data packet into a third data packet in response to the determination that said destination address is the IP address of said second intelligent module, wherein the source address of said third data packet is the IP address of the second physical network card and said destination address is the IP address of said second intelligent module; and sending said third data packet to the second intelligent module via said second physical network, comprises:
   converting said first data packet into a third data packet in response to the determination that said destination address is the IP address of said second intelligent module, wherein the source address of said third data packet is the IP address of the second physical network card connected to the second intelligent module and said destination address is the IP address of said second intelligent module; sending said third data packet to the second intelligent module via said second physical network connected to the second intelligent module.

4. The method according to claim 1, wherein prior to receiving, by said host, a first data packet sent by a first intelligent module via said second physical network card, said method further comprises:
   receiving, by said host, a configuration request sent by said first intelligent module via said second physical network card;
   parsing a MAC address of said first intelligent module out of said configuration request and assigning an IP address to said first intelligent module according to the IP address assigned to said second physical network card by the host; and
   returning the IP address, assigned to said first intelligent module, to said first intelligent module via said second physical network card.

5. A routing method for a combined television comprising a host and at least one intelligent module, wherein said host is connected to an external network via a first physical network card, and said host is connected to said at least one intelligent module via at least one second physical network card, said method comprising:
   receiving, by said host, a first data packet via said first physical network card;
   parsing said first data packet to obtain a source address and a destination address from said first data packet, wherein said source address is an IP address of the external network and said destination address is an IP address of a target intelligent module;
   obtaining an IP address of a corresponding second physical network card according to the IP address of said target intelligent module;
   converting said first data packet into a second data packet, wherein a source address of said second data packet is an IP address of said second physical network card and a destination address of said second data packet is the IP address of said target intelligent module; and
   sending said second data packet to said target intelligent module via said second physical network card.

6. The method according to claim 5, wherein obtaining the IP address of the corresponding second physical network card based on the IP address of said target intelligent module, comprises:
   retrieving the IP address of the second physical network card corresponding to the IP address of said target intelligent module from an information mapping table, wherein said information mapping table is used for storing history of the data packet received/sent by said host via said second physical network card, wherein said history comprises the corresponding relationship between the destination address and source address of the data packet received/sent via said second physical network card.

7. A combined television comprising a host and at least one intelligent module, wherein said host comprises a first physical network card and at least one second physical network card, said host is connected to an external network via said first physical network card, said host is connected to said at least one intelligent module via said at least one second physical network card, and said host further comprises a memory for storing instructions and at least one processor, wherein the at least one processor is configured to execute the instructions to:
  receive a first data packet sent by a first intelligent module of said at least one intelligent module via said second physical network card;
  parse said first data packet to obtain a source address and a destination address from said first data packet, wherein said source address is an IP address of said first intelligent module;
  convert said first data packet into a second data packet in response to the determination that said destination address is an IP address of the external network, wherein the source address in said second data packet is an IP address of the first physical network card and said destination address is the IP address of the external network; and send said second data packet to the external network via said first physical network card.

8. The combined television according to claim 7, wherein said at least one processor is further configured to execute the instructions to:
  convert said first data packet into a third data packet in response to the determination that said destination address is an IP address of a second intelligent module of said at least one intelligent module, wherein a source address in said third data packet is the IP address of the second physical network card and said destination address is an IP address of said second intelligent module; and send said third data packet to said second intelligent module via said second physical network card.

9. The combined television according to claim 8, wherein said combined television comprises more than one second physical network card, each second physical network card is at least connected to one intelligent module;
  wherein said at least one processor is further configured to execute the instructions to receive the first data packet sent by said first intelligent module via the second physical network card connected to the first intelligent module; and
  said at least one processor is further configured to execute the instructions to:
  convert said first data packet into the third data packet in response to the determination that said destination address is the IP address of said second intelligent module, wherein the source address in said third data packet is the IP address of the second physical network card connected to the second intelligent module; and send said third data packet to the second intelligent module via said second physical network card connected to the second intelligent module.

10. The combined television according to claims 7, wherein said at least one processor is further configured to execute the instructions to:
  receive a configuration request sent by said first intelligent module via said second physical network card;
  parse a MAC address of said first intelligent module out of said configuration request; and assign an IP address to said first intelligent module according to the IP address assigned to said second physical network card by the host; and
  return the IP address, assigned to said first intelligent module, to said first intelligent module via said second physical network card.

11. A combined television comprising a host and at least one intelligent module, said host being connected to an external network via a first physical network card, said host being connected to said at least one intelligent module via at least one second physical network card, and said host further comprising a memory for storing instructions and at least one processor, wherein the at least one processor is configured to execute the instructions to:
  receive a first data packet via said first physical network card;
  parse said first data packet to obtain a source address and a destination address from said first data packet, wherein said source address is an IP address of the external network and said destination address is an IP address of an target intelligent module;
  obtain an IP address of a corresponding second physical network card according to the IP address of said target intelligent module;
  convert said first data packet into a second data packet, wherein a source address of said second data packet is the IP address of said second physical network card and a destination address of said second data packet is the IP address of said target intelligent module; and
  send said second data packet to said target intelligent module via said second physical network card.

12. The combined television according to claim 11, wherein said at least one processor is further configured to execute the instructions to:
  retrieve the IP address of the second physical network card corresponding to the IP address of said target intelligent module from an information mapping table, wherein said information mapping table is used for storing history of data packets received/sent by said host via said second physical network card, wherein said history comprises a corresponding relationship between the destination address and source address of the data packet received/sent via said second physical network card.

* * * * *